Oct. 24, 1950 L. R. HUSSA 2,527,362
DUAL STEERING CONTROL ARRANGEMENT FOR BOATS
Filed Dec. 26, 1947 2 Sheets-Sheet 1
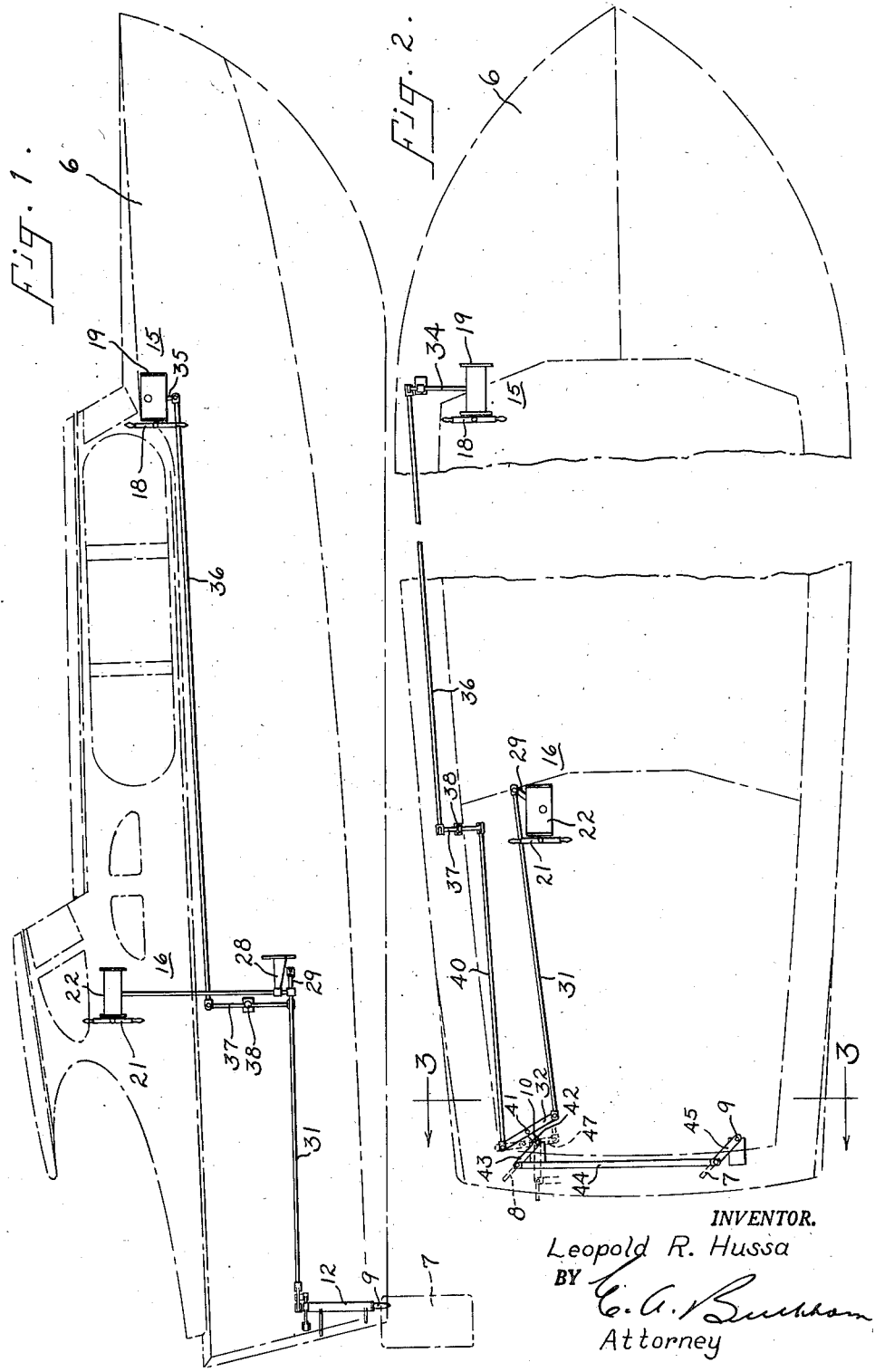
INVENTOR.
Leopold R. Hussa
BY
Attorney Oct. 24, 1950  L. R. HUSSA  2,527,362
DUAL STEERING CONTROL ARRANGEMENT FOR BOATS
Filed Dec. 26, 1947  2 Sheets-Sheet 2
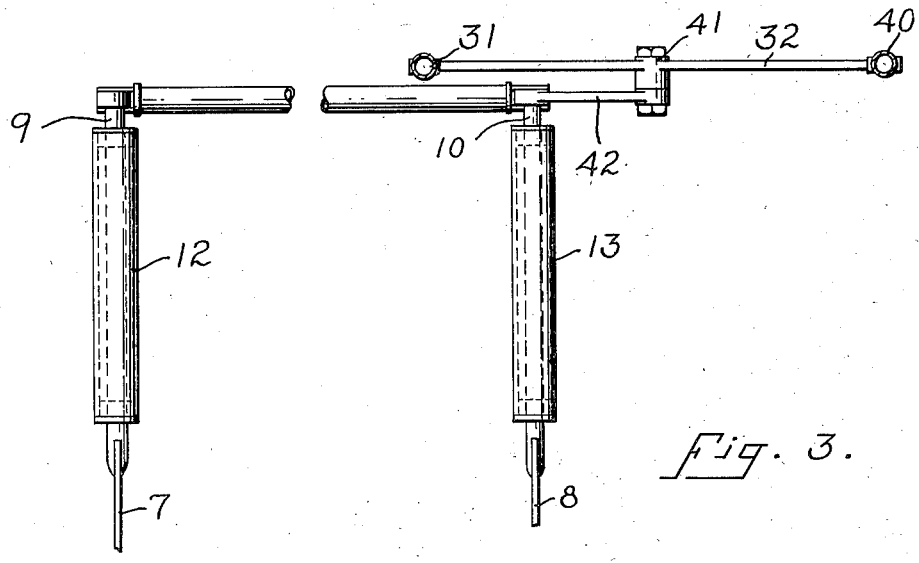
Fig. 3.
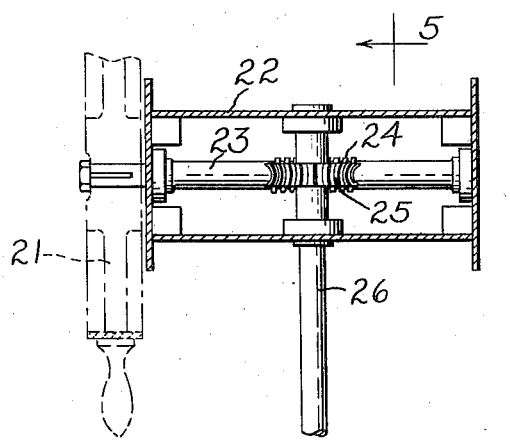
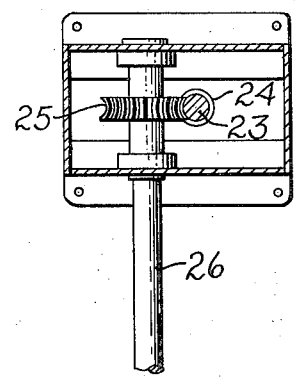
Fig. 5.
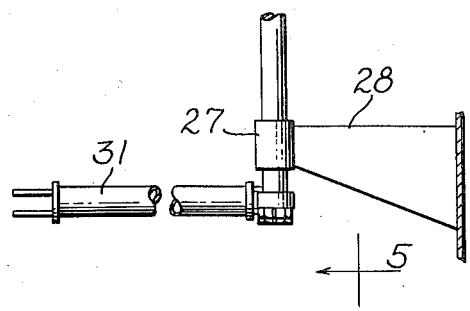
Fig. 4.
INVENTOR.
Leopold R. Hussa
BY
Attorney Patented Oct. 24, 1950

2,527,362

UNITED STATES PATENT OFFICE 2,527,362

DUAL STEERING CONTROL ARRANGEMENT FOR BOATS

Leopold R. Hussa, Portland, Oreg.

Application December 26, 1947, Serial No. 793,899

1 Claim. (Cl. 114—146)

The present invention relates to dual control arrangements for adjusting the angular position of a shaft and has for a general object the provision of a new and novel arrangement for controlling the angular position of adjustment of a shaft from a pair of spaced apart manual control stations.

In many instances, it is desirable to provide means for selectively controlling the angular position of adjustment of a rotatable element from a pair of spaced apart positions. For example, it is frequently desired to provide boats with both fore and aft steering stations. Sometimes, in the case of pleasure boats, the aft station is positioned on the after deck while the forward station is located within the cabin whereby the pilot is not confined to a particular post but can shift from one station to the other as he may desire. While various different dual station steering arrangements have been provided heretofore, they have all had certain inherent disadvantages and left much to be desired.

It is a further general object of the present invention to provide a control arrangement of the type described which is of relatively simple design, low cost manufacture, easy to operate and to maintain.

A more specific object of the present invention is to provide a manual adjusting means for controlling the angular position of adjustment of a shaft and including a pair of manual, independently operable units so connected to the shaft through motion transmitting means whereby the angular position of the shaft may be selectively adjusted by either of the manually controlled units, the unit which is not in use remaining stationary throughout the period of operation by the other manual unit.

It is another object of the invention to provide a dual steering control arrangement for boats in which a pair of steering wheels located at different parts of the boat are both connected to the rudder post in such a manner that the rudder may be selectively adjusted by operation of either wheel, the motion transmission means between each wheel and the rudder post being so arranged that, while one of the wheels is being manually operated, the other wheel remains stationary.

For a consideration of what is believed novel and inventive, attention is directed to the following description taken in connection with the accompanying drawing while the features of novelty will be pointed out with a greater particularity in the appended claim.

In the drawings, Fig. 1 is a side elevation illustrating a boat in phantom outline and showing the dual station steering control arrangement therefor according to the present invention; Fig. 2 is a plan view of the arrangement shown in Fig. 1; Fig. 3 is an enlarged detail view taken along the line 3—3 of Fig. 2; Fig. 4 is an enlarged view, partly in section, illustrating a further detail of the apparatus incorporated in the steering control arrangement illustrated in Figs. 1 and 2; Fig. 5 is a view taken along the line 5—5 of Fig. 4.

In the following description, the invention will be described with particular reference to a dual station steering control arrangement for boats. It is to be understood, however, that the control arrangement is not to be necessarily limited to the specific application illustrated and described since it will be obvious to those skilled in the art that the control arrangement shown is susceptible to adaptation in other instances where it may be desired to control the angular adjustment of a rotatable unit or shaft from a plurality of spaced apart control stations.

Referring now particularly to Figs. 1 and 2 of of the drawings, the hull of a boat is illustrated by broken lines at 6, the boat being of a twin screw type and provided with a pair of rudders 7 and 8 mounted upon the lower ends of rudder posts 9 and 10, the rudder posts being suitably journaled within housings 12 and 13 mounted within the hull of the boat. Fore and aft steering stations indicated generally by the reference characters 15 and 16, respectively, are provided at longitudinally spaced apart locations within the boat, the forward control unit consisting of a wheel 18 and a gear unit 19 while the aft station 16 includes a wheel 21 and a gear unit 22.

The gear units 19 and 22 are similar to each other and only one of them, the unit 22, is illustrated in enlarged detail in the views of Figs. 4 and 5. Referring now to the Figs. 4 and 5, the wheel 21 is secured onto the end of a shaft 23 suitably journaled in opposite walls of the gear housing 22. A worm 24 is provided upon the shaft 23, the worm being meshed with a cooperating gear 25 mounted upon shaft 26 extending at right angles to the shaft 23 and also journaled in opposite walls of the housing 22. The gear housing 22 is suitably mounted upon the structural framework of the boat, and the lower end of the shaft 26 is journaled within a bearing 27 mounted upon the end of a bracket arm 28. A crank arm 29 is suitably secured onto the lower end of the shaft 26, the opposite end of the arm 28 being hingedly connected to the end of a rod 31, the opposite end of the rod 31 being hingedly connected to one end of the bar 32.

The gear unit 19 of the forward control station is similar to that described above except that the housing is mounted at right angles as compared with the unit 22 whereby the driven shaft 34 extends horizontally therefrom. A crank arm 35 secured onto the end of the shaft 34 depends downwardly therefrom and is hingedly connected to a rod 36 extending rearwardly along the hull, the rear end of the rod 36 being hingedly connected to one end of a lever 37 which is pivotally mounted at its midpoint 38 upon the hull framework. The lower end of the lever 37 is hingedly connected to a rod 40, the opposite end of which is hingedly connected to the other end of the bar 32.

The bar 32 is pivotally mounted as at 41 upon one end of the crank arm 42, the crank arm 42 being fixedly secured to the upper end of the rudder post 10. Extending at right angles to the crank arm 42 is a second crank arm 43 which is connected by a cross link 44 to the end of crank arm 45 fixedly secured to the upper end of the second rudder post 9.

The crank arms 43 and 45 extend substantially at right angles with respect to the longitudinal axis of the rudder posts and rearwardly therefrom parallel with the planes of the corresponding parallel rudders. The crank arm 42 extends at right angles with respect to the arm 43 or in a direction at right angles to the planes of the rudders. In Fig. 2, the forward steering unit is shown in the neutral position while the aft steering unit is shown in a hard-over to port condition of adjustment. In the neutral position of both the fore and aft steering units, the bar 32 will extend in a direction parallel with the crank arm 42, the neutral position, indicated by the dotted lines 47, being transversely of the longitudinal axis of the boat. By virtue of the worm gear units at each of the steering stations, the corresponding end of the crossbar 32 will be fixedly retained in the position of adjustment of the steering wheel. Thus, for example, upon adjustment of the aft steering wheel 21, the crossbar 32 will be pivoted about the hinge connection of the cross bar to the end of the rod 40 and the crank arm 24 connected to the midpoint of the bar 32 will be carried by the crossbar to effect adjustment of the angular rotation of the rudder post 12 by an amount corresponding exactly to the extent of movement of the wheel 21. During adjustment of the wheel 21, motion will not be transmitted through the rods 40 and 36 to effect rotation of the forward wheel 18.

It is to be understood that, when the pilot desires to move from one steering station to the other, he will first adjust the steering wheel to the neutral position before taking over control by the other wheel. When either wheel is thus left in the neutral position, it will remain in such position during manual adjustment of the other wheel for reasons stated above.

Having described the invention in what is considered to be a typical embodiment thereof, it is desired that it be understood that the invention is not necessarily to be limited to the details shown in that numerous modifications will occur to one skilled in the art. It is intended in the following claim to cover all such modifications as fall within the true spirit and scope of the invention.

I claim:

A steering control arrangement for boats comprising a rudder post, a rudder vane on said post, a crank arm secured to the upper end of said post and extending therefrom at right angles with respect to said post and the plane of said vane, a bar having its midpoint pivotally connected to said arm for movement in a plane at right angles to the axis of said post, said bar in the neutral position of said vane extending parallel with said arm, a pair of steering control wheels mounted respectively at fore and aft positions on said boat, independent motion transmitting means connected between each of said wheels and the corresponding ends of said bar, said motion transmitting means each including a worm gear unit and a crank arm driven by said unit, and linkages connecting each of said last mentioned crank arms and a corresponding end of said bar.

LEOPOLD R. HUSSA.

REFERENCES CITED

The following references are of record in the file of this patent:

FOREIGN PATENTS

| Number | Country | Date |
|---|---|---|
| 34,658 | Denmark | June 16, 1925 |